E. ELLERMAN.
CONVERTIBLE COASTER.
APPLICATION FILED APR. 28, 1913.

1,140,805. Patented May 25, 1915.

Witnesses
Jos. A. Ryan
A. Ellison

Inventor
Edward Ellerman
By Chandler & Chandler
Attorneys

UNITED STATES PATENT OFFICE.

EDWARD ELLERMAN, OF DENVER, COLORADO.

CONVERTIBLE COASTER.

1,140,805.   Specification of Letters Patent.   Patented May 25, 1915.

Application filed April 28, 1913. Serial No. 764,185.

*To all whom it may concern:*

Be it known that I, EDWARD ELLERMAN, a citizen of the United States, residing at Denver, in the county of Denver, State of Colorado, have invented certain new and useful Improvements in Convertible Coasters; and I do hereby declare the following to be a full, clear, and exact description of the invention, such as will enable others skilled in the art to which it appertains to make and use the same.

This invention relates to new and useful improvements in sledding devices and more particularly to a convertible coaster.

The essential object of the invention is evolved in the provision of a coaster of the character named which may be readily changed from a sled to a wheeled vehicle and in the construction of such device of a few simple and very light novel parts, thus rendering the device capable of being readily handled with the least possible exertion, as well as permitting it to speedily pass over the ground surface as a wheeled vehicle or over snow as a sled.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1:
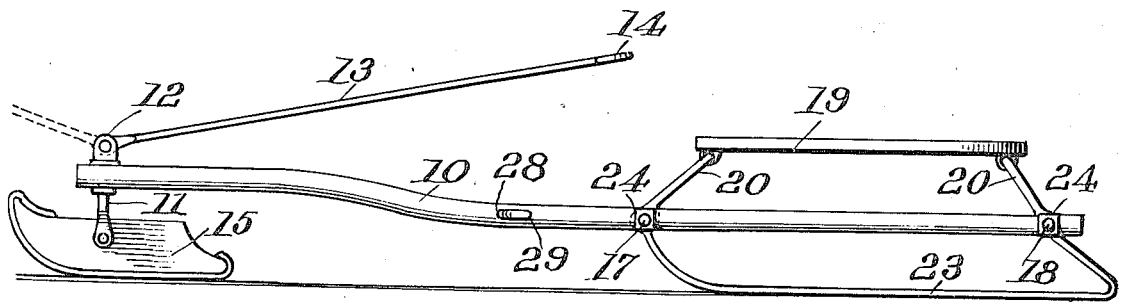
Figure 2:
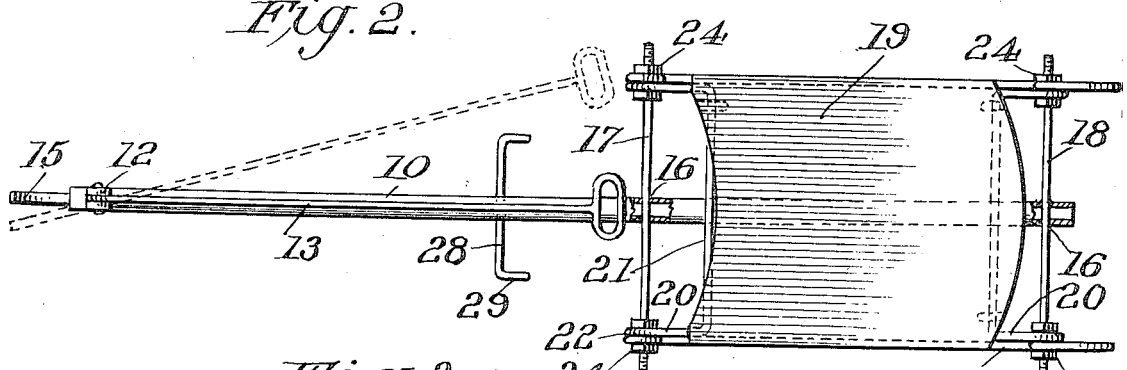
Figure 3:
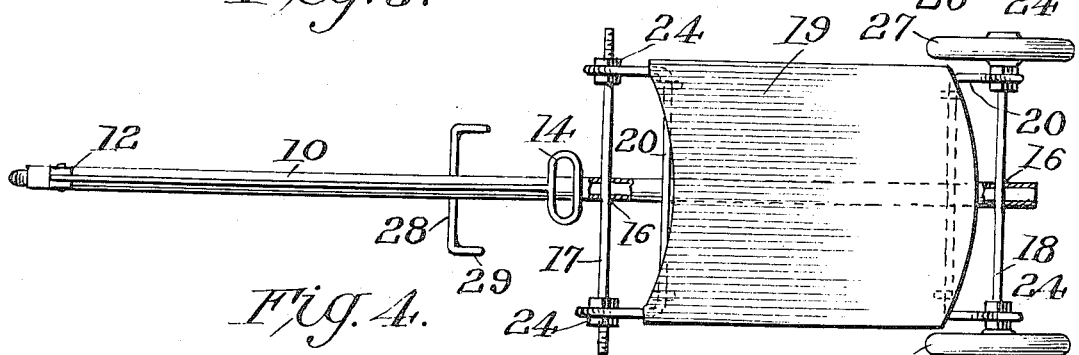
Figure 4:
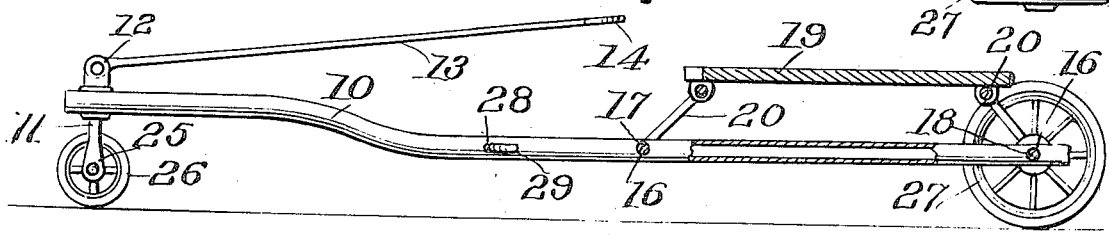

Figure 1 is a side elevation of the improved convertible coaster in use as a sled. Fig. 2 is a top plan view thereof. Fig. 3 is a top plan view of the device, partly in section as a wheeled vehicle. Fig. 4 is a central longitudinal sectional view of the device as a wheeled vehicle.

In illustrating the preferred embodiment of the invention, the device is shown as embodying a central beam 10 preferably formed of an elongated tube, such as a pipe. This beam or center bar is provided at its forward end with a vertical pivot 11 having its upper end formed with spaced apertured ears 12 for the pivotal attachment of a combined pull rod and steering standard 13 which is formed with a hand grip or loop 14 at its free end. This member 13 is adapted to be positioned rearwardly when guiding the vehicle as in coasting, or forwardly as shown in dotted lines in Fig. 1 when serving as a pull rod. Attached to the lower end of the pivot 11 is a runner 15 which serves for steering the device when turned at the proper angle through the medium of the standard. At suitably spaced points near the rear extremity of the beam or bar 10, are provided transverse openings 16 through which a pair of axles 17 and 18 are rigidly secured to project beyond the sides of the bar at equal distances. A seat 19 is supported over and in spaced relation above the beam or bar 10 through the instrumentality of a pair of inverted U-shaped braces 20 having their bight portions 21 connected to the seat and having the lower extremities of their neck portions forked as shown at 22 for the attachment of the axles. It will also be observed that the braces 20 extend forwardly and rearwardly of the ends of the seat, thus forming a sort of a spring for the seat, as well as rendering the structure stronger. The axles 17 and 18 are adapted for the removable attachment of the extremities of runners 23, these runners being constructed of single lengths of metal and having their extremities clamped to the axles as shown at 24 whereby they may be readily removed or replaced.

In the form of the device shown in Figs. 3 and 4, in lieu of using the runners 15 and 23, the lower end of the pivot 11 is provided with a fork 25 carrying a steering wheel 26, while wheels 27 are journaled on the ends of the axle 18. It is also understood that the proportions of the parts may be varied at will and when the operator is seated upon the coaster, the feet may be engaged against a foot rest 28 in the form of a bar transversely engaged through the longitudinal beam of center bar 10 in a similar manner as the axles 17 and 18 are engaged therethrough. The extremities of the foot rest are bent rearwardly as shown at 29 to prevent displacement of the feet so that the body may be held steady to prevent one's-self from falling off, especially when turning the device. It is further apparent that the device is almost wholly constructed of metal, the seat being the only part which is formed of wood.

I claim:

1. In a convertible coaster, a tubular beam, a vertical pivot at the forward end of the beam, a steering rod connected to the pivot, a single traction member carried by the pivot beneath the beam, a pair of axles engaged through the beam horizontally and spaced apart with relation to each other, a seat, inverted U-shaped braces connecting the seat to the axles and traction members engaged with the axles.

2. In a convertible coaster, a beam, a pivot at the forward end of said beam, a steering rod connected to said pivot, a single traction member carried by the pivot beneath the beam, spaced axles supported by the beam, a seat, braces connecting the seat to aforementioned axles, and traction members carried by the axles.

In testimony whereof, I affix my signature, in the presence of two witnesses.

EDWARD ELLERMAN.

Witnesses:
FRED W. NIESTRADT,
WILLIAM H. SEYMOUR.